US012631571B2

(12) United States Patent
Mayer

(10) Patent No.: US 12,631,571 B2
(45) Date of Patent: May 19, 2026

(54) APPARATUS FOR FULLY AUTOMATED X-RAY TOMOGRAPHY SYSTEM PERFORMANCE VALIDATION ACCORDING TO STANDARDS FOR METROLOGY AND IMAGE QUALITY TESTING

(71) Applicant: Baker Hughes Holdings LLC, Houston, TX (US)

(72) Inventor: Thomas Mayer, Seesen (DE)

(73) Assignee: Baker Hughes Holdings LLC, Houston, TX (US)

( * ) Notice: Subject to any disclaimer, the term of this patent is extended or adjusted under 35 U.S.C. 154(b) by 289 days.

(21) Appl. No.: 18/129,536

(22) Filed: Mar. 31, 2023

(65) Prior Publication Data

US 2024/0328965 A1 Oct. 3, 2024

(51) Int. Cl.
*G01N 23/046* (2018.01)

(52) U.S. Cl.
CPC ..... *G01N 23/046* (2013.01); *G01N 2223/303* (2013.01)

(58) Field of Classification Search
CPC ......... G01N 23/046; G01N 2223/3037; G01N 2223/303; G01N 23/083; G01N 23/10; G01N 2223/04; G01N 2223/643; G01N 2223/3308; G01N 2223/419; G01N 21/9501; G01N 21/9515; G01N 23/04;
(Continued)

(56) References Cited

U.S. PATENT DOCUMENTS

| | | |
|---|---|---|
| 7,738,624 B2 | 6/2010 | Herold et al. |
| 10,739,492 B2 | 8/2020 | Atherton et al. |

(Continued)

OTHER PUBLICATIONS

Cho "Designing Phantoms for Industrial Computed Tomography" IEEE Conference Publication; First ACIS International Symposium on Software and Network Engineering; 2011; 2 pages.
(Continued)

*Primary Examiner* — Irakli Kiknadze
(74) *Attorney, Agent, or Firm* — Mintz, Levin, Cohn, Ferris, Glovsky and Popeo, P.C.

(57) ABSTRACT

An apparatus for calibrating or validating performance of a computed tomography (CT) scanner including a first element having a first diameter, a second element having a base structure and a first set of test objects that can be coupled to the base structure and separated from one another by a first set of distances. The apparatus also includes a third element having a second diameter and a first length, a fourth element having a first face and a second face parallel to one another with a first depth defined there between. The fourth element can include: a first cavity depressed a second depth into the first face, a fifth element including a plurality of wire pairs and disposed within the first cavity, a second cavity depressed into the first face such that a third depth is defined between a back wall of the second cavity and the second face, a sixth element including a first plurality of holes and a first thickness, the sixth element disposed within the second cavity, and a seventh element including a second plurality of holes and a second thickness, the seventh element disposed on the first face. A center of the first element, the second element, the third element, and the fourth element, respectively, are be aligned along a first axis.

20 Claims, 9 Drawing Sheets

(58) Field of Classification Search

CPC ... G01N 2223/6113; G01N 2223/3306; G01N 27/62; A61B 34/20; A61B 2034/2065; A61B 2034/2051; A61B 2034/2055; A61B 6/032; A61B 6/4014; A61B 6/4021; A61B 6/4007; A61B 6/405; A61B 6/482; A61B 6/583; A61B 6/4035; G06T 5/10; G06T 7/0012; G06T 7/33; G06T 5/80; G06T 2207/20061; G06T 7/85; G06T 5/006; G06T 7/001; G06T 2207/30168; G06T 2207/30164; G06T 2207/20076; G06T 2207/10116; G06T 7/0004; G06T 7/60; G06T 7/62; G06T 7/64; G06T 2207/30148; G06T 11/005; G06T 2211/408; G06T 2207/30141; G06T 7/73; G06T 7/521; G06T 2207/10028; G06T 2207/30244; G06T 2200/04; H01L 21/681; H01L 21/67259; H01L 21/67103; H01L 22/12; H01L 22/20; H01L 21/26566; H01L 22/30; H01L 22/10; H01L 21/265; H04N 23/695; G01V 5/22; G01B 11/24; G01B 11/2441; G01B 11/306; G01B 2210/48; G01B 2210/56; G01B 15/00; G01B 11/00; G01T 7/005; G01T 1/167; G01T 1/169; H01J 37/3171; H01J 2237/24507; H01J 2237/24592; H01J 2237/31703; G01S 17/89; G01S 7/4808; G06F 16/583

USPC ......................................... 378/4, 19, 207, 18

See application file for complete search history.

(56) References Cited

U.S. PATENT DOCUMENTS

| | | | |
|---|---|---|---|
| 11,000,239 B2 | 5/2021 | Miller et al. | |
| 2013/0156164 A1* | 6/2013 | Chida | A61B 6/583 |
| | | | 378/207 |
| 2017/0112462 A1* | 4/2017 | O'Hare | G01T 7/005 |
| 2021/0145395 A1 | 5/2021 | Boone et al. | |
| 2023/0011644 A1 | 1/2023 | Zhao | |

OTHER PUBLICATIONS

Waygate Technologies; CT computed tomography machine true| position| ruby| plate; Brochure printed Jan. 20, 2023; 4 pages.

\* cited by examiner

300

FIG. 5
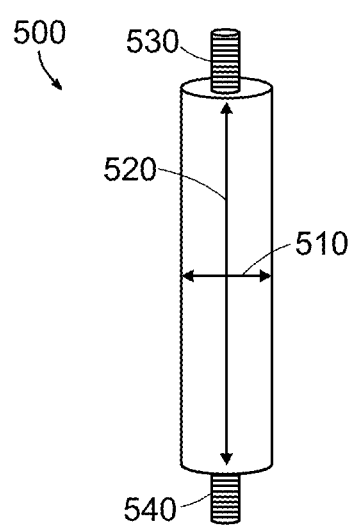
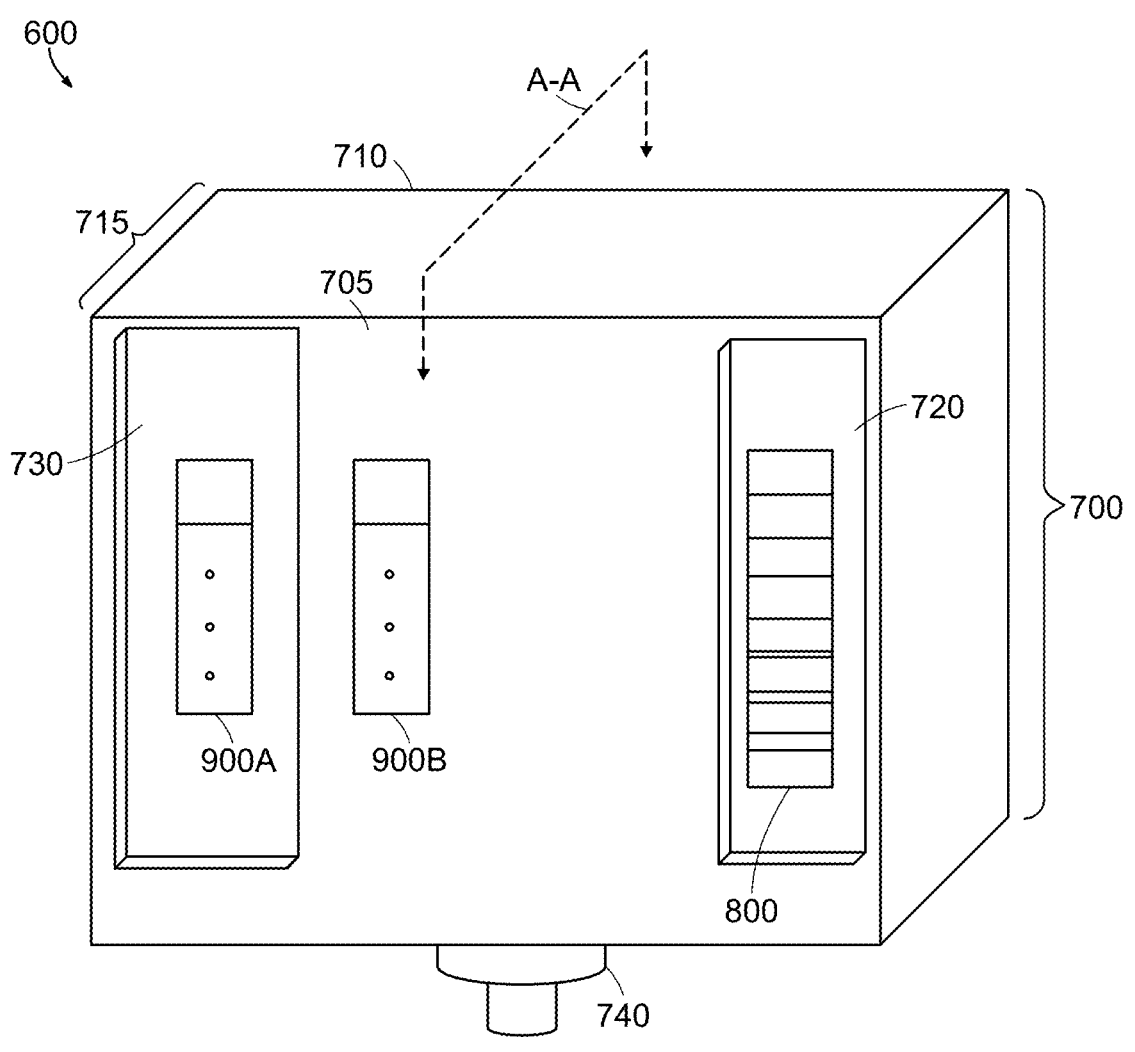
FIG. 6A

Figure 9:
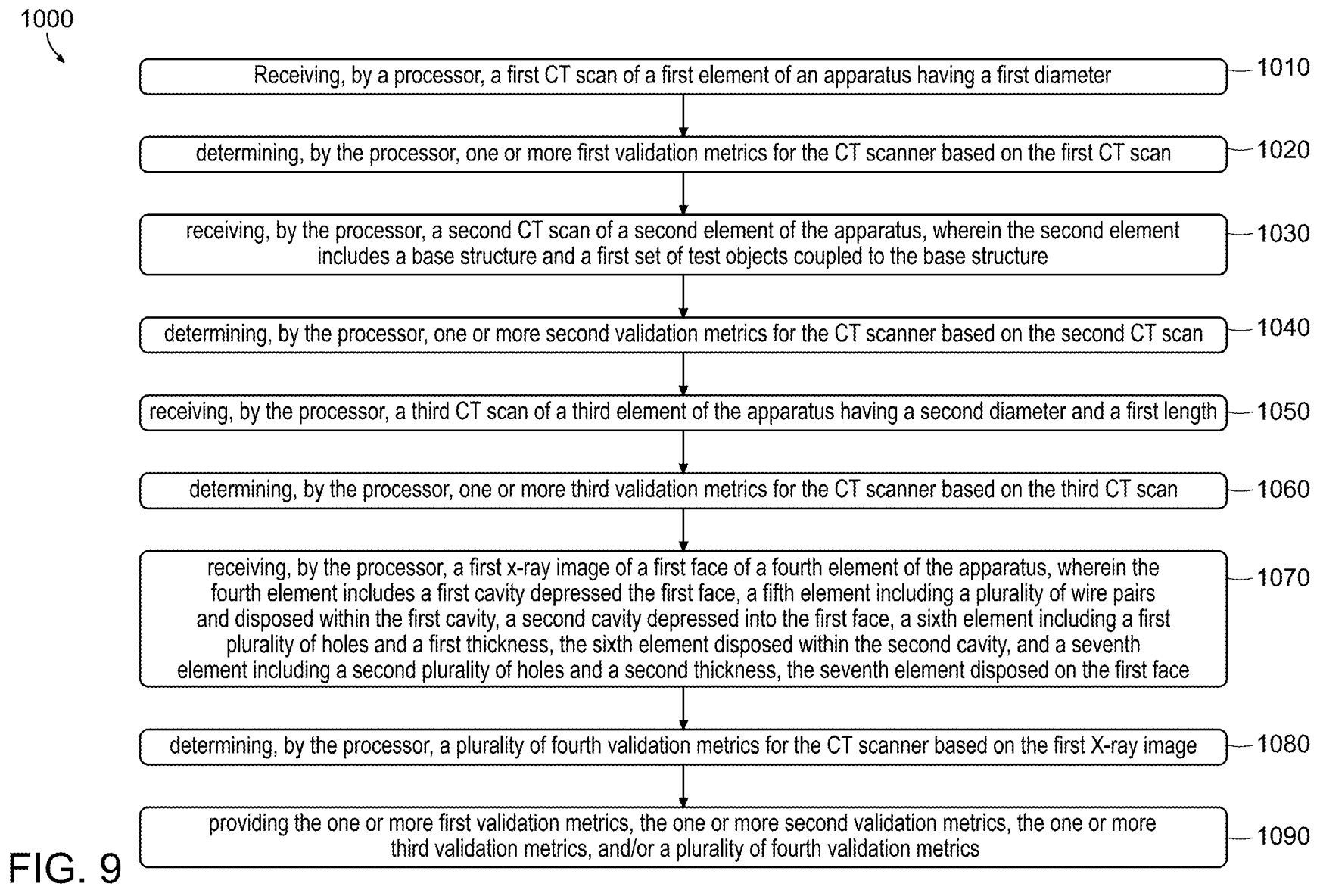

Receiving, by a processor, a first CT scan of a first element of an apparatus having a first diameter — 1010 determining, by the processor, one or more first validation metrics for the CT scanner based on the first CT scan — 1020 receiving, by the processor, a second CT scan of a second element of the apparatus, wherein the second element includes a base structure and a first set of test objects coupled to the base structure — 1030 determining, by the processor, one or more second validation metrics for the CT scanner based on the second CT scan — 1040 receiving, by the processor, a third CT scan of a third element of the apparatus having a second diameter and a first length — 1050 determining, by the processor, one or more third validation metrics for the CT scanner based on the third CT scan — 1060 receiving, by the processor, a first x-ray image of a first face of a fourth element of the apparatus, wherein the fourth element includes a first cavity depressed the first face, a fifth element including a plurality of wire pairs and disposed within the first cavity, a second cavity depressed into the first face, a sixth element including a first plurality of holes and a first thickness, the sixth element disposed within the second cavity, and a seventh element including a second plurality of holes and a second thickness, the seventh element disposed on the first face — 1070 determining, by the processor, a plurality of fourth validation metrics for the CT scanner based on the first X-ray image — 1080 providing the one or more first validation metrics, the one or more second validation metrics, the one or more third validation metrics, and/or a plurality of fourth validation metrics — 1090

APPARATUS FOR FULLY AUTOMATED X-RAY TOMOGRAPHY SYSTEM PERFORMANCE VALIDATION ACCORDING TO STANDARDS FOR METROLOGY AND IMAGE QUALITY TESTING

TECHNICAL FIELD

The subject matter described herein relates to an apparatus, systems and methods for fully automated x-ray/computed tomography (CT) system performance validation for metrology and image quality testing.

BACKGROUND

Industrial computed tomography (CT) scanning systems are commonly used to produce three-dimensional representations of industrial parts. For example, industrial CT scanning systems can facilitate nondestructive internal inspection of industrial machine parts. As a result, CT scanning can be used for flaw detection, assembly analysis, and failure analysis of machine parts. CT scanning involves irradiating a machine part with an electromagnetic radiation (e.g., X-ray) and detecting a portion of the radiation that is modified (e.g., transmitted, reflected, and the like) by the machine part. This process is repeated for various orientations of the machine part and at various locations of the machine part with respect to the source of the radiation. Based on detection of multiple images of the machine parts (e.g., for the various orientations and locations), a three-dimensional representation of the machine part can be generated (e.g., by a computing device).

CT scanning systems have to be calibrated or validated (e.g., prior to a measurement) for generating accurate three-dimensional representations, and further, have to be regularly assessed to determine the state of the system performance over time as various components deteriorate. System calibration or validation of performance can involve assessment of dimensional measurement capabilities and measurement uncertainty (e.g., length measurement errors) of the scanning system. This can be done by scanning a measurement apparatus (e.g. a phantom object) and calculating measurement uncertainty based on the generated x-ray images and CT scans in combination with the known geometry of the apparatus.

Guidelines such as VDI/VDE 2630, ASTM E1695, and ASTM E2737 provide guidelines for specifying the accuracy of CT an x-ray scanning systems. These guidelines were developed to help to ensure to users that their systems are operating with a desired level of accuracy. System performance validation for metrology and image quality testing for x-ray/CT systems is crucial for ensuring accurate and reliable measurements and image quality, as the accuracy and reliability of the measurements and images produced by these systems can have a significant impact on the safety, quality, and performance of the products they are used to test or inspect. Without proper validation systems and methods, it can be difficult for users to detect inaccurate measurements, missed defects, etc. This can lead to increased costs in scrap, production delays, safety hazards, etc. The use of standardized testing apparatuses, systems and methods can help ensure consistent and reliable results across different systems and applications.

SUMMARY

An apparatus, system and method for calibrating or validating performance of a computed tomography (CT) scanner is provided. In one embodiment, the apparatus can include: a first element having a first diameter, a second element having a base structure and a first set of test objects that can be coupled to the base structure and separated from one another by a first set of distances, a third element having a second diameter and a first length, a fourth element having a first face and a second face parallel to one another with a first depth defined there between. The fourth element can further include: a first cavity depressed a second depth into the first face, a fifth element including a plurality of wire pairs and disposed within the first cavity, a second cavity depressed into the first face such that a third depth is defined between a back wall of the second cavity and the second face, a sixth element including a first plurality of holes and a first thickness, the sixth element disposed within the second cavity, and a seventh element including a second plurality of holes and a second thickness, the seventh element disposed on the first face. A center of the first element, the second element, the third element, and the fourth element, respectively, can be aligned along a first axis.

In another embodiment, the apparatus can further include a coupling component located on a third face or a fourth face of the fourth element, the coupling component arranged to couple the apparatus to a positioning element. A center of the coupling component can be centered along the first axis. In another embodiment, the positioning element can be coupled to the coupling component and can to rotate the apparatus about the first axis. In another embodiment, the positioning element can move the apparatus in a three-dimensional space between the CT scanner and a detector.

In another embodiment, the first element can be a sphere. In another embodiment, the first set of test objects can include one or more first spherical elements having a first radius, and one or more second spherical elements having a second radius different from the first radius. In another embodiment, the first set of test objects can be made from ruby and/or ceramic. In another embodiment, the base structure can be a ceramic plate. In another embodiment, the third element can be a cylinder.

In another embodiment, the plurality of wire pairs of the fifth element further include wire pairs ranging in diameter from a smallest wire diameter to a largest wire diameter, further wherein a first wire of each pair is separated from a second wire of the pair by a distance equivalent to the diameter of each wire in the pair.

In another embodiment, the first thickness of the sixth element can be a first predefined percentage of the third depth, and the first plurality of holes include a first hole having a diameter that is equal to the first thickness, a second hole having a diameter that is twice the first thickness, and a third hole having a diameter that is four times the first thickness. Similarly, the second thickness of seventh element can be a second predefined percentage of the first depth, and the second plurality of holes include a fourth hole having a diameter that is equal to the second thickness, a fifth hole having a diameter that is twice the second thickness, and a sixth hole having a diameter of that is four times the second thickness.

In another aspect, a system for calibrating or validating performance of a computed tomography (CT) scanner is provided. In one embodiment, the system includes an apparatus for validating performance of a computed tomography scanner including: a first element having a first diameter, a second element comprising a base structure and a first set of test objects coupled to the base structure and separated from one another by a first set of distances, a third element having a second diameter and a first length, and a fourth element having a first face and a second face parallel to one another with a first depth defined there between. The fourth element can further include: a first cavity depressed a second depth into the first face, a fifth element including a plurality of wire pairs and disposed within the first cavity, a second cavity depressed into the first face such that a third depth is defined between a back wall of the second cavity and the second face, a sixth element including a first plurality of holes and a first thickness, the sixth element disposed within the second cavity, and a seventh element including a second plurality of holes and a second thickness, the seventh element disposed on the first face. A center of the first element, the second element, the third element, and the fourth element, respectively, can be aligned along a first axis. The system can also include a computing system coupled to a computed tomography (CT) scanner, the computing system including at least one data processor and a memory storing instructions which, when executed by the at least one processor, can cause the at least one processor to perform operations including: receiving, by at least one data processor of a computing system coupled to a computed tomography (CT) scanner, a first CT scan of the apparatus, determining, by the at least one data processor, one or more first validation metrics for the CT scanner based on the first CT scan, receiving, by the at least one processor, a second CT scan of the apparatus, determining, by the at least one processor, one or more second validation metrics for the CT scanner based on the second CT scan, receiving, by the at least one processor, a third CT scan of the apparatus, determining, by the at least one processor, one or more third validation metrics for the CT scanner based on the third CT scan, receiving, by the at least one processor, a first x-ray image of the apparatus, determining, by the at least one processor, a plurality of fourth validation metrics for the CT scanner based on the first x-ray image, and providing the one or more first validation metrics, the one or more second validation metrics, the one or more third validation metrics, and/or a plurality of fourth validation metrics.

In another embodiment, the system can further include a coupling component coupled to the fourth element on a third face or a fourth face with a center of the coupling component aligned with the first axis, wherein the coupling component can couple the apparatus to a positioning element. The positioning element can be communicatively coupled to the computing system, wherein the at least one processor can control the positioning element to cause the positioning element to rotate the apparatus about the first axis and move the apparatus in a three-dimensional space between the CT scanner and a detector.

In another embodiment, the at least on processor can further perform operations including: positioning, by the positioning element, the apparatus within the three-dimensional space such that the first CT scan includes the first element, positioning, by the positioning element, the apparatus within the three-dimensional space such that the second CT scan includes the second element, positioning, by the positioning element, the apparatus within the three-dimensional space such that the third CT scan includes the third element, and positioning, by the positioning element, the apparatus within the three-dimensional space such that the first x-ray image includes the first face of the first element.

In another aspect, a method calibrating or validating performance of a computed tomography (CT) scanner is provided. In one embodiment, the method can include: receiving, by at least one data processor of a computing system coupled to a computed tomography (CT) scanner, a first CT scan of a first element of an apparatus having a first diameter, determining, by the at least one data processor, one or more first validation metrics for the CT scanner based on the first CT scan, receiving, by the at least one processor, a second CT scan of a second element of the apparatus, wherein the second element includes a base structure and a first set of test objects coupled to the base structure, determining, by the at least one processor, one or more second validation metrics for the CT scanner based on the second CT scan, receiving, by the at least one processor, a third CT scan of a third element of the apparatus having a second diameter and a first length, determining, by the at least one processor, one or more third validation metrics for the CT scanner based on the third CT scan, receiving, by the at least one processor, a first x-ray image of a first face of a fourth element of the apparatus, wherein the fourth element includes a first cavity depressed the first face, a fifth element including a plurality of wire pairs and disposed within the first cavity, a second cavity depressed into the first face, a sixth element including a first plurality of holes and a first thickness, the sixth element disposed within the second cavity, and a seventh element including a second plurality of holes and a second thickness, the seventh element disposed on the first face determining, by the at least one processor, a plurality of fourth validation metrics for the CT scanner based on the first x-ray image, and providing the one or more first validation metrics, the one or more second validation metrics, the one or more third validation metrics, and/or a plurality of fourth validation metrics.

In another embodiment, the method can further include: determining, by the at least one processor, a first scan diameter of the first element corresponding to the first diameter from the first CT scan, determining, by the at least one processor, a first set of scan distances corresponding to the first set of distances separating the first set of test objects from the second CT scan, determining, by the at least one processor, a second scan diameter and a first scan length corresponding to the second diameter and the first length, respectively of the third element from the third CT scan, determining, by the at least one processor, a smallest detected wire pair of the plurality of wire pairs of the fifth element from the first x-ray image, determining, by the at least one processor, a first difference in pixel intensity between the sixth element and the back wall of the second cavity, and a smallest detected hole of the first plurality of holes of the sixth element from the first x-ray image, determining, by the at least one processor, a second difference in pixel intensity between the seventh element and the first face, and a smallest detected hole of the second plurality of holes of the seventh element from the first x-ray image, determining, by the at least one processor, at least one region of interest of the fourth element from the first x-ray image, and determining, by the at least one processor, at least one mean signal value corresponding to the at least one region of interest, and at least one standard deviation for each of the at least one mean signal value from the first x-ray image.

In another embodiment, the one or more first validation metrics can include a probing error form and/or a probing error size, the one or more second validation metrics can include at least one sphere distance error, the one or more third validation metrics can include at least one modulation transfer function and/or at least one contrast detail function, and the plurality of fourth validation metrics can include a spatial resolution, a contrast-to-noise ratio, a contrast sensitivity, and/or the at least one signal-to-noise ratio.

In another embodiment, a center of the first element, the second element, the third element, and the fourth element, respectively, can be aligned along a first axis, and the apparatus can further include a coupling component located on a third face or a fourth face of the fourth element with a center of the coupling component aligned with the first axis and arranged to couple the apparatus to a positioning element arranged to rotate the apparatus about the first axis. In this embodiment, the method can further include: rotating, by the positioning element, the apparatus about the first axis during the first CT scan, the second CT scan, and the third CT scan. In another embodiment, the positioning element can move the apparatus in a three-dimensional space between the CT scanner and a detector. In another embodiment, the method can further include moving, by the positioning element, the apparatus in a three-dimensional space between the CT scanner and a detector.

In another embodiment, the method can further include: positioning, by the positioning element, the apparatus within the three-dimensional space such that the first CT scan includes the first element, positioning, by the positioning element, the apparatus within the three-dimensional space such that the second CT scan includes the second element, positioning, by the positioning element, the apparatus within the three-dimensional space such that the third CT scan includes the third element, and positioning, by the positioning element, the apparatus within the three-dimensional space such that the first x-ray image includes the first face of the first element.

DESCRIPTION OF DRAWINGS

These and other features will be more readily understood from the following detailed description taken in conjunction with the accompanying drawings, in which:

FIG. 5 is a diagram illustrating an embodiment of a third element of the CT system validation apparatus of FIG. 2;

FIG. 6A is a diagram illustrating an embodiment of an assembly including a fourth element, a fifth element, one or more sixth elements and a seventh element of the CT system validation apparatus of FIG. 2;

FIG. 9 is a flow chart illustrating an embodiment of a method for validating a CT system using a validation apparatus as described herein.

Figure 1:
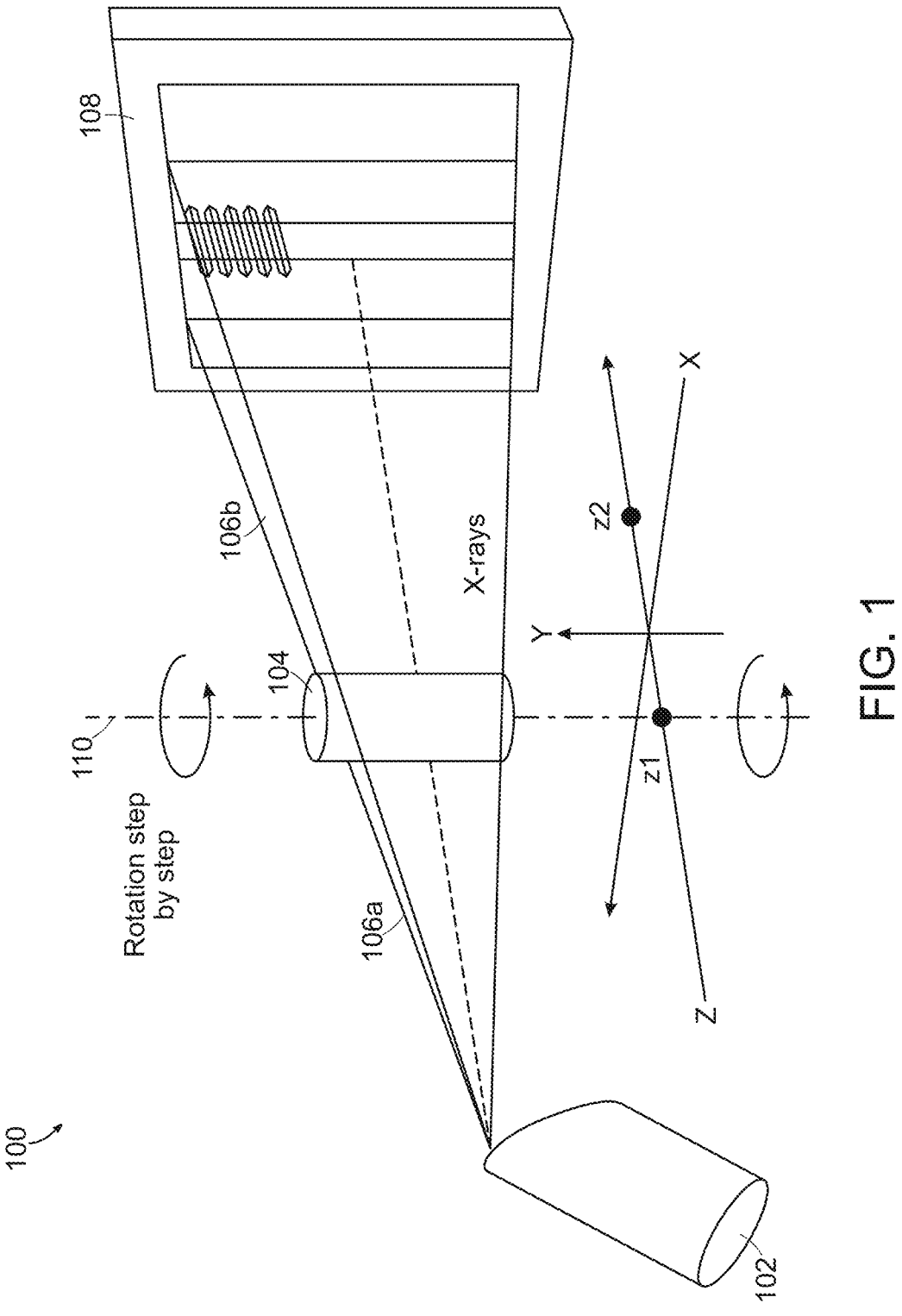
FIG. 1 is a diagram illustrating an embodiment of a CT Scanning system as described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

In the fields of x-ray and CT scanning, CT systems have to be initially calibrated prior to use to ensure that they are generating accurate three-dimensional representations of scanned objects. Further, CT systems have to be regularly assessed to determine the state of the system performance over time as various components deteriorate. Traditionally, comprehensive system calibration and validation requires several test apparatuses and several pieces of analysis software in order to perform the metrology and image quality validation that operators require. Additionally, the operators may need officially certificated skills and training on standards, technology, and workmanship standards to perform and evaluate the results of the calibration and validation tests. The necessity for multiple test objects can lead to time consuming calibration and validation can also lead to errors and/or mistakes being made during calibration and validation.

Accordingly, the apparatus, systems and method provided herein address the aforementioned shortcomings by providing a user with a single, integrated validation apparatus, and an accompanying integrated computing system for performing automatic, comprehensive CT system calibration and/or validation. The apparatus, systems and method provided herein can be designed to ensure that a CT system is calibrated and validated based on a plurality of standards in the field, such as VDI/VDE 2630, ASTM E1695, and ASTM E2737 guidelines. The integrated validation apparatus, and an accompanying computing system described herein are capable of automatically performing a series of validations scans and providing an operator a plurality of validation metrics. The variety of probing error metrics can include, for example, probing error form and/or probing error size, sphere distance error, a modulation transfer function, a contrast detail function, a spatial resolution, a contrast-to-noise ratio, a contrast sensitivity, and/or a signal-to-noise ratio of the CT system in a way that can be easily interpreted by the operator.

Advantageously, the apparatus, systems and methods described herein provide an operator with an integrated validation apparatus, and accompanying computing system that does not require the presence of the operator during majority of the validation process, reducing sources of human error. Accordingly, the apparatus, systems and methods described herein significantly reduce the time needed for routine test procedures and allow for a higher frequency of validation tests to be run which can more accurately ensure quality, performance and safety. This can reduce labor costs and greatly increase x-ray and CT system availability. Further, the integrated validation apparatus described herein is optimized in weight, size, shape, and material make up to ensure minimal disturbing physical effects during validation.

FIG. 1 is an illustration of an exemplary industrial computer tomography (CT) system 100 that can perform nondestructive machine inspection of industrial machine parts. The system 100 includes a radiation source 102 that can illuminate an industrial machine part 104 with an electromagnetic radiation 106*a* (e.g., X-rays traveling along the z-axis). In one implementation, the machine part 104 can be a phantom that can allow for the calibration or verification of accuracy of the industrial CT system 100. The machine part 104 can interact with the electromagnetic radiation 106*a* (e.g., absorb, reflect, scatter, etc.), and can produce a modified electromagnetic radiation 106*b*. A detector 108 can detect the modified electromagnetic radiation 106*b*. This detection process can be repeated by varying the orientation between the machine part 104 and the detector 108. For example, the machine part 104 can be rotated about an axis 110 (e.g., parallel to the y-axis), and the detector 108 can detect the modified electromagnetic radiation 106*b* for various orientations of the machine part 104 during the rotation. Alternately or additionally, the detector 108 and the radiation source 102 can be rotated about the machine part 104 (e.g., rotated in the x-z plane about the y-axis) and the modified electromagnetic radiation 106*b* can be detected for various angular positions of the detector 108 and the radiation source 102. Detection of modified electromagnetic radiation 106*b* at various angular location can be repeated for different locations (e.g., locations between the radiation source 102 and the detector 108) of the machine part 104. For example, the location of the machine part 104 can be varied along the z-axis. A first measurement (e.g. by rotating the machine part and detecting the modified electromagnetic radiation 106*b* for multiple angular orientation) can be performed at location z1, and a second measurement can be performed at the location z2. The machine part 104 can be rotated (e.g., at z1, z2, and the like) by an actuator. Based on the various image detections by the detector 108, a three-dimensional representation of the machine part 104 can be generated (e.g., by a computing device).

Figure 2:
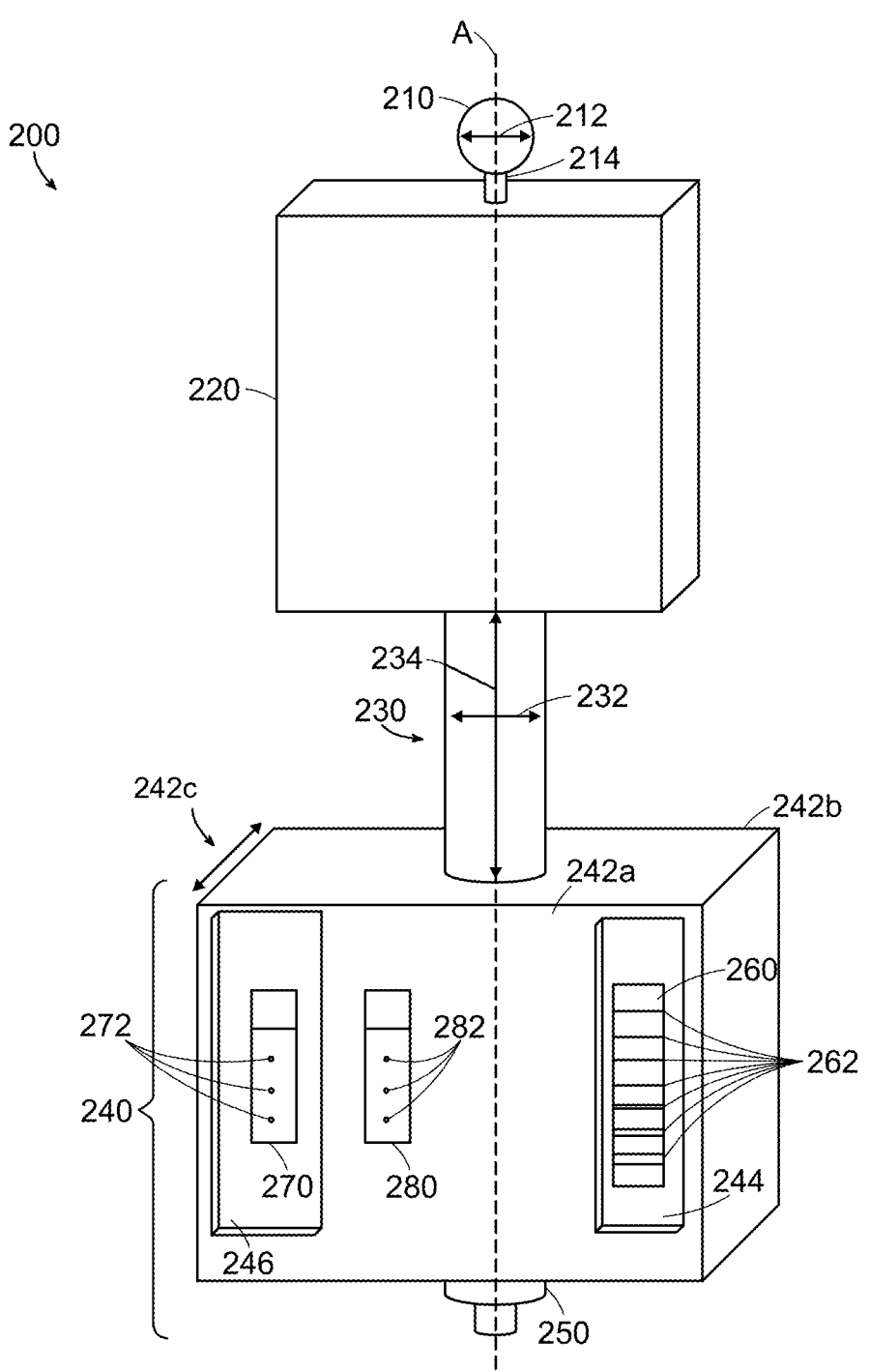
FIG. 2 is a diagram illustrating an embodiment of a CT system validation apparatus as described herein.

FIG. 2 illustrates exemplary embodiment 200 of an integrated validation apparatus for preforming fully automated CT/x-ray system performance validation according to standards for metrology and image quality testing. The apparatus 200 can include a first element 210 having a first diameter 212 and a connection 214. In some embodiments, the connection 214 can be configured to connect the first element 210 to a second element of the apparatus 200 (discussed below). The first element 210 can be used to determine, for example, a probing error form and probing error size of a CT system (e.g., CT system 100). In some embodiments, the first element 210 can be designed based on VDI/VDE 2630 guidelines or other guidelines of the like. The details of the first element 210 will be discussed in greater detail below in reference to FIG. 3.

The apparatus can also include a second element 220, which can include a first set of test objects (not shown) disposed within the second element 220. In some embodiments, the second element 220 can be used to determine, for example, a sphere distance error (SDE) of the CT system (e.g., CT system 100). In some embodiments, the second element 220 can be designed based on the VDI/VDE 2630 guidelines or other guidelines of the like. The details of the second element 220 will be discussed in greater detail below in reference to FIGS. 4A-4C.

The apparatus can also include a third element 230 having a second diameter 232 and a first length 234. In some embodiments, the third element 230 can be used to determine, for example, a Modulation Transfer Function (MTF) and a Contrast Discrimination Function (CDF) of the CT system (e.g., CT system 100). In some embodiments, the third element 230 can be a cylinder designed based on the ASTM E1695 guidelines or other guidelines of the like. The details of the third element 230 will be discussed in greater detail below in reference to FIG. 5.

The apparatus 200 can further include a fourth element 240. In some embodiments, the fourth element 240 can be generally prismatic in shape and can include a first face 242*a* and a second face 242*b*, and a first depth 242*c* defined between the first face 242*a* and the second face 242*b*. The fourth element 240 can also include a first cavity 244 depressed a second depth 244*a* into the first face 242*a* of the fourth element 240, and one or more second cavities 246 depressed into the first face 242*a* such that one or more third depths (not shown) are defined between a back wall of the one or more second cavities 246 and the second face 242*b*, as described in greater detail below. In some embodiments, the fourth element 240 can be used to determine at least one signal-to-noise ratio (SNR) of the CT system (e.g., CT system 100) for a given material. In some embodiments, the fourth element 240 can be made of aluminum. In some embodiments, the fourth element 240 can be designed based on the ASTM E2737 guidelines or other guidelines of the like. The details of the fourth element 240 will be discussed in greater detail below in reference to FIGS. 6A-6B.

In some embodiments, the apparatus 200 can further include a positioning element 250 configured to rotate the apparatus about a first axis A. In some embodiments, the positioning element 250 can be coupled the fourth element 240, however, it could also be coupled to another component of the apparatus 200. The details of the positioning element 250 will be discussed in greater detail below.

The apparatus 200 can further include a fifth element 260 including a plurality of wire pairs 262 configured to assess, for example, a resolution of the CT system (e.g., CT system 100) over a range of feature sizes. In some embodiments, the fifth element can be a duplex wire designed based on ASTM E2002 guidelines or other guidelines of the like, as will be discussed in greater detail below in reference to FIG. 7. In some embodiments, the fifth element 260 can be disposed within the first cavity 244 of the fourth element 240.

The apparatus 200 can also include, one or more sixth elements 270 configured to determine, for example, a contrast-to-noise ratio (CNR) and a contrast sensitivity (CS) of the CT system (e.g., CT system 100). Each of the one or more sixth elements 270 can also include a first plurality of holes 272 and a first thickness (not shown). In some embodiments, each of the one or more sixth elements 270 can be disposed within the one or more second cavities 246. The apparatus 200 can also include a seventh element 280 including a second plurality of holes 282 and a second thickness (not shown). In some embodiments, the seventh element 280 can be disposed on the first face 242*a*. In some embodiments, the one or more first sixth elements 270 and the seventh element 280 can be one or more image quality indicators (IQIs) designed based on the ASTM E1025 guidelines or other guidelines of the like. The details of the one or more sixth elements 270 and the seventh element 280 will be discussed in greater detail below in reference to FIG. 8.

During calibration and validation procedures, components of the apparatus 200 can get damaged or degrade over time. Accordingly, in some embodiments, the apparatus 200 can be fully modular to allow for replacement of any of the elements including elements 210, 220, 230, 240, 250, 260, 270, and/or 280. In some embodiments, the connections between components can be mated connections (e.g., threaded connections). Alternatively, in some embodiments, the connections between elements can rely on an adhesive or magnetic connection or the like.

Figure 3:
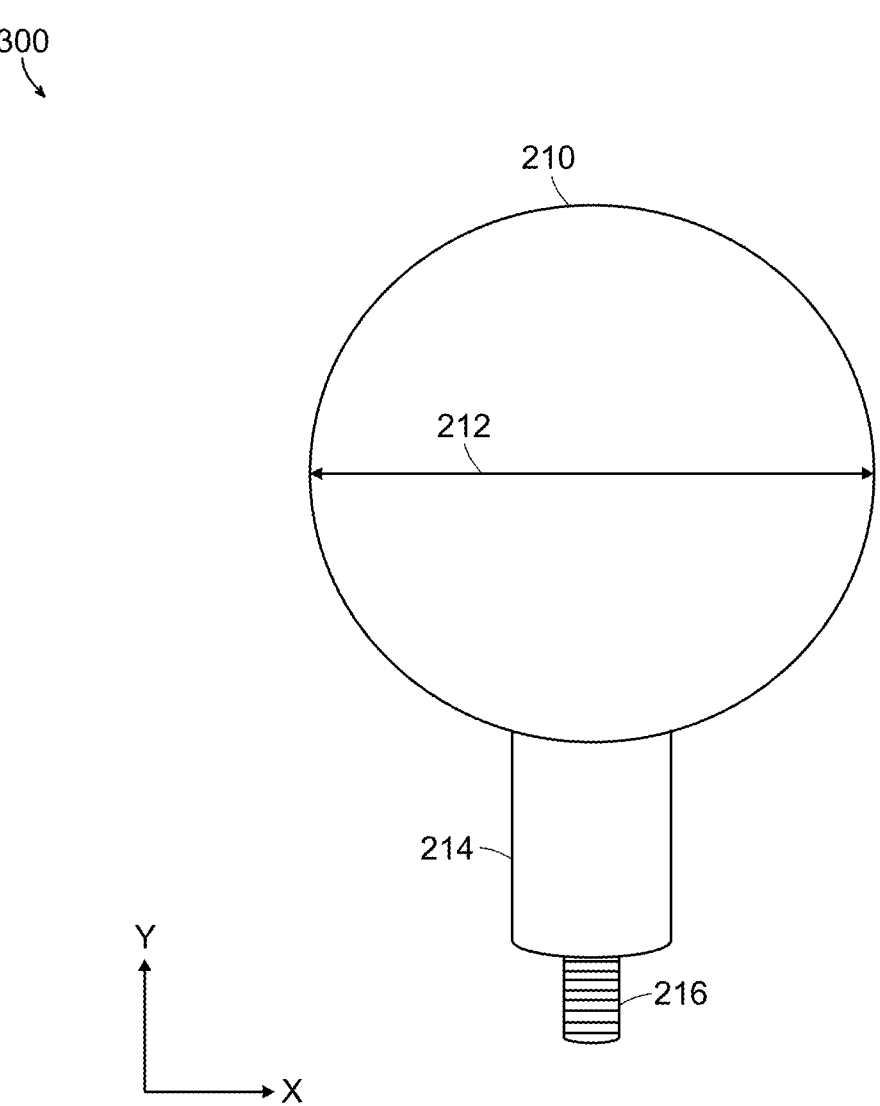
FIG. 3 is a diagram illustrating an embodiment of a first element of the CT system validation apparatus of FIG. 2.

FIG. 3 illustrates an exemplary embodiment 300 of the first element 210 of FIG. 2. As discussed above, the first element 210 can have a first diameter 212, which can be accurately measured by a calibrated metrology system, such as a coordinate measuring machine (CMM), a laser/optical scanner, or the like to accurately capture the geometry and dimensions of the first element 210. In some embodiments, the first element 210 can include a connection 214 configured to allow the first element 210 to be coupled to the rest of a validation apparatus (e.g., apparatus 200). In some embodiments, the connection 214 can include a threaded portion 216 configured to mate with a corresponding component of the apparatus 200. In some embodiments, the connection can include a clamp connection, a magnetic connection, an adhesive connection, or the like.

During a CT scanning validation process, the first element 210 can be scanned while rotating the first element 210 develop a CT scan that can be used in combination with the first diameter 212 to determine a probing error form and a probing error size for the system. Since the first element 210 is scanned at different orientations and positions a full range of probing errors can be captured.

The probing error form can be determined by comparing the measured surface of the sphere to its true surface, which can be calculated based on the known diameter and material properties of the sphere. A mathematical model can be fitted to the measured data to quantify the shape of the probing error. In some embodiments, the first element 210 can be a sphere made from a variety of materials, for example, in some embodiments, the sphere can be made from aluminum oxide. In some embodiments, the first diameter 212 can be between 20-40 mm, ideally 30 mm, however, other diameters can be used.

The probing error size can be determined by calculating the standard deviation of the position error at each point on the sphere. The standard deviation provides a measure of the magnitude of the probing error and can be used to compare the performance of different CT scanners.

In some embodiments, the first element 210 can be designed to ensure that the performance of the system (e.g., system 100) is properly validated based on the VDI/VDE 2630 standard (specifically, VDI/VDE 2630 4.1.2). VDI/VDE 2630 is a standard that provides guidelines for validating the performance of CT imaging systems used in industrial applications. The standard aims to ensure that the CT scans produced by these systems are accurate, reliable, and consistent with established quality requirements. The validation process includes verification of system parameters, assessment of imaging performance, evaluation of image quality, and documentation of the results, providing a comprehensive approach to CT scan validation, as discussed in greater detail below.

Figures 4A, 4B, 4C:
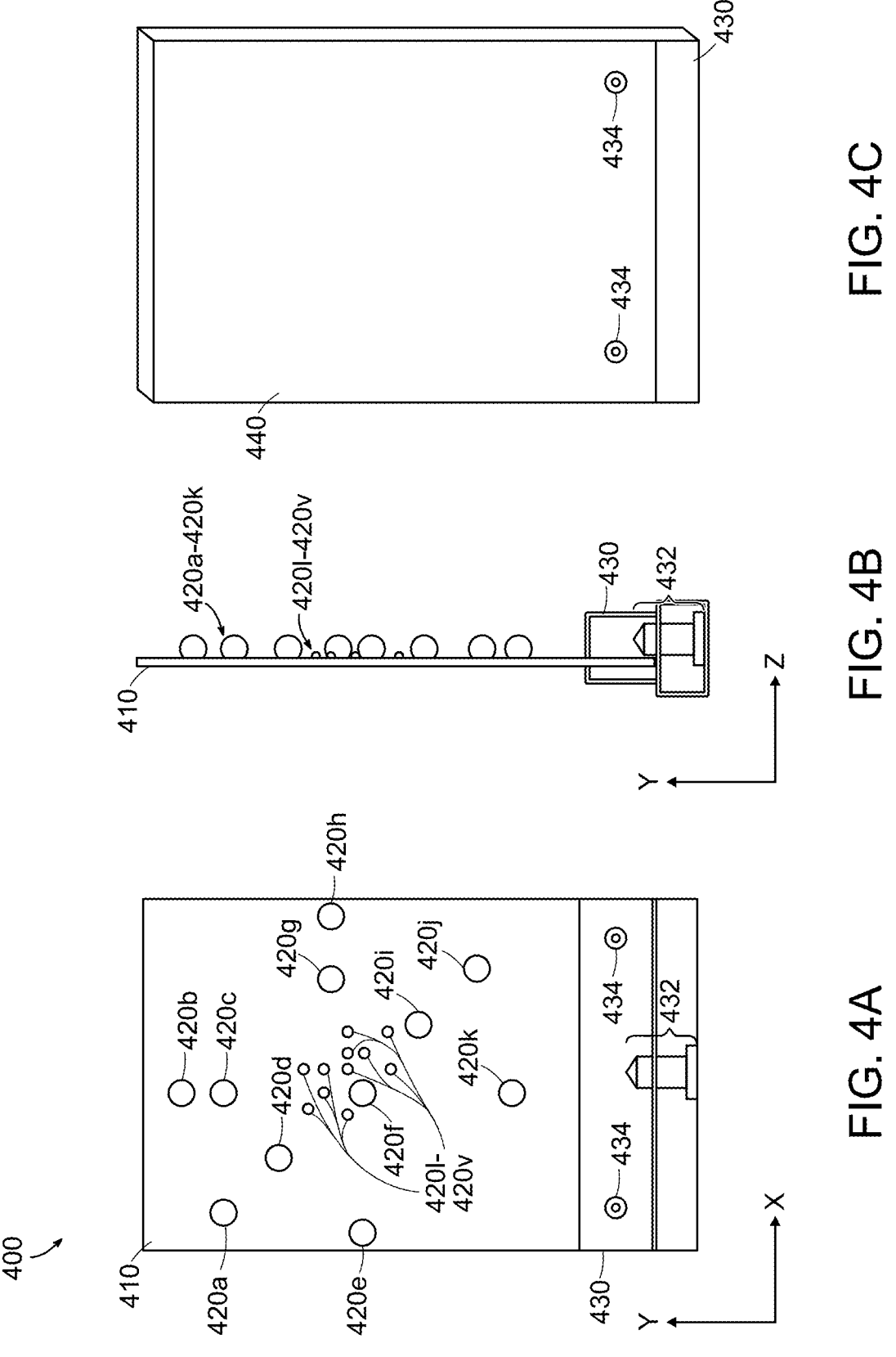
FIG. 4A is a diagram illustrating a front view of an embodiment of a second element of the CT system validation apparatus of FIG. 2 without a cover.
FIG. 4B is a diagram illustrating a side view of an embodiment of the second element of the CT system validation apparatus of FIG. 2.
FIG. 4C is a diagram illustrating a front view of an embodiment of a second element of the CT system validation apparatus of FIG. 2 with a cover.

FIG. 4A is a front view of an exemplary embodiment of a second element 400 that can be used for calibration or verification of a CT system (e.g., CT system 100). In some embodiments, the second element 400 can be similar to the second element 200 of FIG. 2. The second element 400 can include a base structure 410 and a first set of test objects (e.g., 420a-420v) separated from one another by a first set of distances (in the case of FIG. 4A, the first set of distances can be seen as distances in the x-y plane). In some embodiments, the first set of test objects (e.g., 420a-420v) can have various geometries (e.g., spheres with different radii). In some embodiments, the first set of test objects (e.g., 420a-420v) can be immovably coupled to the base structure 410 to ensure that the first set of distances remain constant. In some embodiments, the base structure 410 can be made from a ceramic material (e.g., $Al_2O_3$, BN, $SiO_2$, $ZrO_2$, $Si_3N_4$) or a mixture of ceramics. In some cases, the base structure 410 can be a ceramic plate having a thickness of 2-3 mm. The first set of test objects (e.g., 420a-420v) can include ruby and/or ceramics. The base structure 410, and the first set of test objects (e.g., 420a-420v) can interact differently with an incident radiation (e.g., electromagnetic radiation 106a) due to differences in their composition, shape, and the like. In some embodiments, the base structure 410 can be coupled to a block 430 which can include a connector 432 and one or more fasteners 434 configured to fasten a cover to the second element 400 as discussed below in relation to FIG. 4C. In some embodiments, the connector 432 can be configured to couple the second element 400 a third element (e.g., element 230), as discussed in greater detail below.

FIG. 4B is a side view of the second element 400, illustrating the base structure 410 and the first set of test objects (e.g., 420a-420v) coupled to the base structure 410. As indicated above, the first set of test objects (e.g., 420a, 420b, etc.) can have various geometries (e.g., spheres with different radii) arranged along multiple axes (in the case of FIG. 4B, the first set of distances can be seen as distances in the z-y plane with the centers of the spheres having different radii protruding out into the z-plane different distances. In some embodiments, the first set of test objects can include a first set of spheres having a first radius (e.g., 420a-420k) and a second set of spheres having a second radius (e.g., 420l-420v).

FIG. 4C illustrates the second element 400 including a cover 440 configured to cover the first set of test objects (e.g., 420a, 420b, etc.), to protect them from being broken off of the base structure 410. In some embodiments, the cover can be configured to connect to the second element 400 at fasteners 434.

In some embodiments, the second element 400 can be used to determine, for example, a sphere distance error (SDE) of the CT system (e.g., CT system 100), and can be designed based on the VDI/VDE 2630 guidelines. Specifically, the second element 400 can be designed to provide validation metrics to comply with VDI/VDE 2630 4.2.4. VDI/VDE 2630 4.2.4 is a section of the standard that describes the procedures for determining the measurement uncertainty of CT scans and provides guidelines for calculating and reporting the uncertainty associated with dimensional measurements made using CT scans. SDE is a measure of the accuracy of the distance measurement between two spheres (e.g., a distance between 420a and 420b) that are placed at a known distance from each other, as determined by the CT scanner, compared to the true distance, as discussed in greater detail below.

A person skilled in the art will appreciate that the features disclosed herein can be arranged in a variety of other configurations, and that the illustrated embodiment is merely one exemplary embodiment. Other embodiments of the second element are disclosed in U.S. Pat. No. 10,539,515, titled "Computed Tomographic System Calibration," filed on Mar. 30, 2018, which is hereby incorporated by reference in its entirety.

FIG. 5 illustrates an embodiment of a third element 500 having a diameter 510 and a length 520. In some embodiments, the third element 500 can be similar to the third element 230 of FIG. 2. In some embodiments, the third element 500 can be used to determine, for example, a Modulation Transfer Function (MTF) and a Contrast Discrimination Function (CDF) of the CT system (e.g., CT system 100), and can be designed to provide validation information according to the ASTM E1695 standard, as discussed in greater detail below. In some embodiments, the third element 500 can be a cylinder, and the diameter 510 can be between 20-40 mm and the length 520 can is between 90-110 mm, although other diameters and lengths can be used. In some embodiments, the third element 500 can include a first connector 530 and a second connector 540 configured to couple the third element 500 to other elements of the apparatus. In some embodiments, for example, the first connector 530 can be configured to mate with the connector 432 of the second element 400. In some embodiments, the second connector 530 can be configured to couple the third element 500 to a fourth element, as discussed in greater detail below. In some embodiments, the third element 500 can be made from aluminum or another type of metal.

Figure 6B:
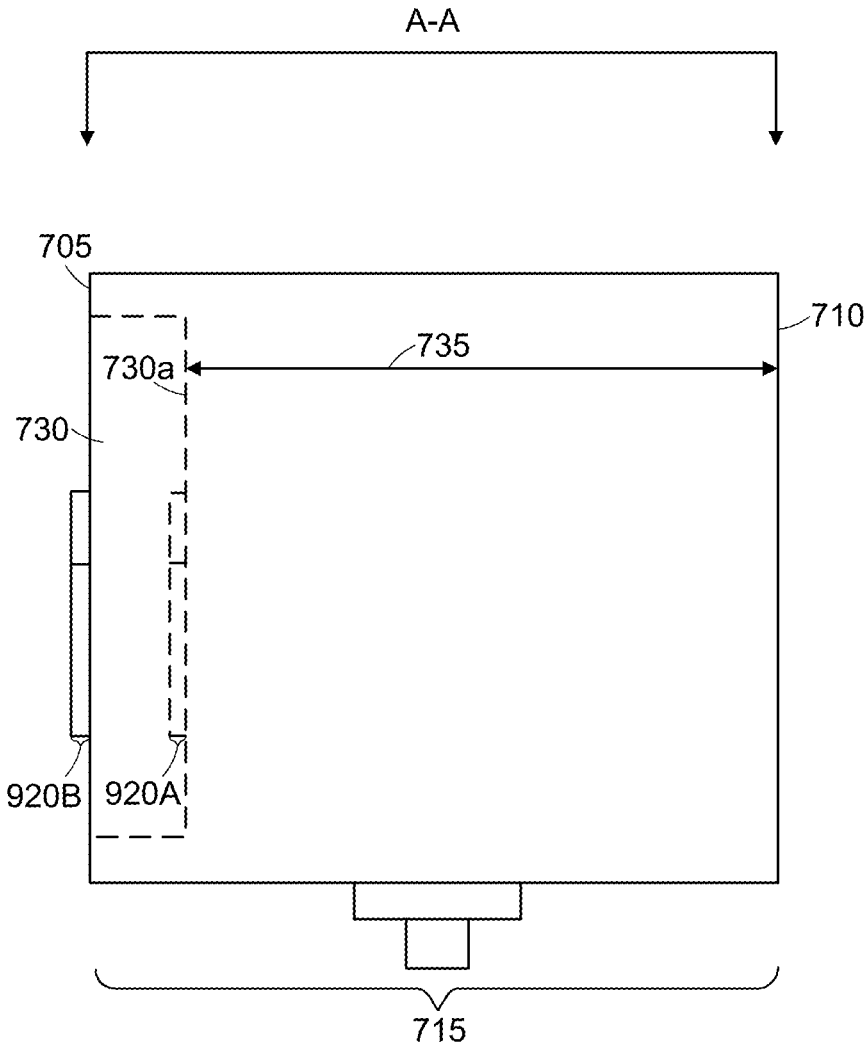
FIG. 6B is a cross-sectional view of the assembly of FIG. 6A taken along section A-A.

FIG. 6A illustrates an isometric view of an assembly 600 including a fourth element 700, a fifth element 800, one or more sixth elements 900A and a seventh element 900B, all of which can be used to determine a plurality of fourth validation metrics for the CT scanner, as will be discussed in greater detail below. In some embodiments, the fourth element 700 can be used to determine one or more signal-to-noise ratios (SNR) of the CT system (e.g., CT system 100) for a given material at one or more depths within the material, as will be discussed in greater detail below. In some embodiments, the fourth element 700 can be similar to the fourth element 240 of FIG. 2. In some embodiments, the fourth element 700 can be generally prismatic in shape and can include a first face 705 and a second face 710, and a first depth 715 defined between the first face 705 and the second face 710. The fourth element 700 can also include a first cavity 720 depressed a second depth 725 (shown in FIG. 6B) into the first face 705. The fifth element 800 can be disposed within the first cavity 720, as discussed in greater detail below. The fourth element 700 can also include one or more second cavities 730 depressed into the first face 705. In some embodiments, the one or more sixth elements 900A can be disposed within the one or more second cavities 730, as discussed in greater detail below. In some embodiments, the fourth element 700 can be made of aluminum-alloy or the like and designed based on the ASTM E2737 guidelines or other guidelines of the like.

A bottom surface of the fourth element 700 can include a connection 740 configured to couple the apparatus (e.g., apparatus 200) to a positioning device. In some embodiments, the positioning device (not shown) can include a chuck configured to receive the connection 740. The positioning device can be configured to move the apparatus 200 along a scanning path, moving the object through a plurality of positions and/or rotating the apparatus 200 about a rotational axis while acquiring one or more scans of the apparatus 200 at each position.

FIG. 6B is a cross-sectional view of the assembly 600 taken along section A-A. As illustrated in FIG. 6B, the fourth element 700 can include a first depth 715 defined between the first face 705 and the second face 710, and one or more second cavities 730 depressed into the first face 705 such that one or more third depths 735 are defined between a back wall 730a of the one or more second cavities 730 and the second face 710. In some embodiments, a thickness 920A of the one or more sixth elements 900A can be determined based on the one or more third depths 735, as described in greater detail below. Similarly, in some embodiments, a thickness 920B of the seventh element 900B can be determined based first depth 715, as described in greater detail below.

Figure 7:
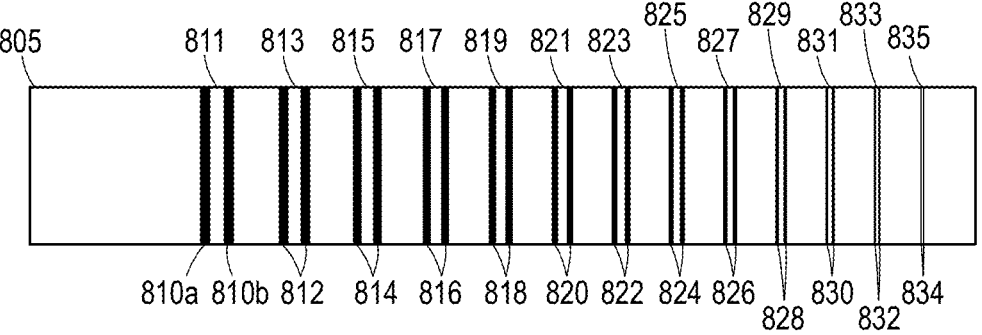
FIG. 7 is a diagram illustrating an embodiment of the fifth element of the CT system validation apparatus of FIG. 2.

FIG. 7 illustrates an exemplary embodiment of the fifth element 800 as described herein. In some embodiments, the fifth element 800 can include a base plate 805 and a plurality of wire pairs (e.g., 810, 812, 814, etc.), wherein each wire pair includes a first wire and a second wire (i.e., 810A and 810B) and a gap there between (e.g., 811, 813, 815, etc.). In some embodiments, the fifth element 800 can be configured to assess, for example, a resolution of the CT system (e.g., CT system 100) over a range of feature sizes. In some embodiments, the fifth element 800 can be a duplex wire designed based on ASTM E2002 guidelines. As illustrated in FIG. 7, the fifth element 800 can includes wire pairs ranging in diameter. For example, in one embodiment, the fifth element 800 can include 13 wire pairs ranging in diameter from 0.800 mm to 0.050 mm, however, other numbers of wire pairs covering other diameter ranges could be used. In some embodiments, the first wire and second wire (i.e., 810A and 810B) of each pair (i.e., 810-834) can be placed parallel to one another and can be separated from one another by a distance equivalent to the diameter of each wire in the pair. For example, if the wire pair 810 includes a first wire 810A having a diameter of 0.8 mm and a second wire 810B having a diameter of 0.8 mm, then the gap 811 between the two wires can be 0.8 mm. In some embodiments, the plurality of wire pairs can be made of materials such as tungsten or platinum, although other materials can be used. It should be noted that all components of the apparatus (e.g., apparatus 200) are machined with a predetermined tolerance. Accordingly, there will always be some level of deviation from the desired dimensions of the components described herein. As described above, the fifth element 800 can be used to determine an image spatial resolution (ISR) of the CT system (e.g., CT system 100), as described in greater detail below. In some embodiments, the fifth element 800 can be disposed within the first cavity 720 of the fourth element 700, in reference to FIG. 6A. In some embodiments, the fifth element 800 can be coupled to a back wall of the first cavity 720 with, for example, an adhesive.

Figure 8:
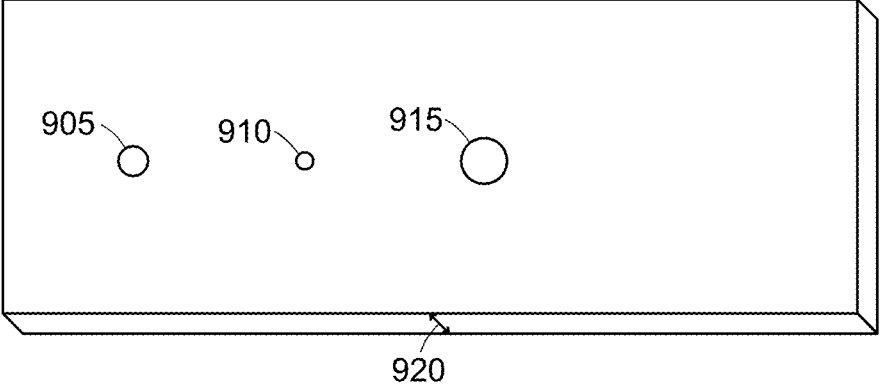
FIG. 8 is a diagram illustrating an embodiment of the one or more sixth elements and/or the seventh element of the CT system validation apparatus of FIG. 2.

FIG. 8 illustrates an exemplary embodiment of an image quality indication (IQI) element 900 according to the subject matter described herein. In some embodiments, the one or more sixth elements 900A and/or the seventh element 900B, in reference to FIG. 6A, can be similar to the IQI element 900 described herein, with each of the one or more sixth elements 900A and the seventh element 900B having different design specifications, as described in greater detail below. The IQI element 900 can be used to determine a contrast-to-noise ratio (CNR) and a contrast sensitivity (CS) of the CT system (e.g., CT system 100). In some embodiments, the IQI 900 can include a plurality of holes 905, 910, 915 and a thickness 920. The diameters of the plurality of holes 905, 910, 915 and the thickness 920 can be determined based on, for example, the ASTM E1025 guidelines for determining CNR and CS of a CT system. Specifically, in some embodiments the thickness 920 of the IQI 900 can be such that it is equivalent to a predefined percentage of the thickness of the material that it is disposed on, the percentage dependent upon the standard that the client is adhering to. For example, in reference to FIG. 6B, the thickness 920B of the seventh element 900B can be equivalent to 2% of the thickness of the material that it is disposed on (i.e., 2% of the first depth 715).

In some embodiments the diameters of the plurality of holes 905, 910, 915 can be sized based on the thickness 920 of the IQI 900. For example, in some embodiments, hole 910 can have a diameter that is equivalent to the thickness 920, hole 905 can have a diameter that is equivalent to two times the thickness 920, and hole 915 can have a diameter that is equivalent to four times the thickness 920. In some embodiments, the IQI 900 can be made from aluminum.

For example, to determine the hole sizes and thickness for an IQI 900 being disposed on a specimen that is 40 mm thick, the following calculations can be used:

$$IQI \text{ Thickness} = t = (0.02)(40 \text{ mm}) = 0.8 \text{ mm}$$

$$\text{Hole } 910 \text{ diameter} = t = 0.8 \text{ mm}$$

$$\text{Hole } 905 \text{ diameter} = 2t = 1.6 \text{ mm}$$

$$\text{Hole } 915 \text{ diameter} = 4t = 4.8 \text{ mm}$$

FIG. 9 illustrates an exemplary method 1000 for determining and providing a user with a variety of validation metrics for a CT scanner (e.g., CT scanner 100) using a calibration/validation apparatus (e.g., apparatus 200).

In some embodiments, the method can include a step 1010 of receiving, by at least one data processor of a computing system coupled to a computed tomography (CT) scanner, a first CT scan of a first element of an apparatus having a first diameter. In some embodiments, the first element can be the first element 210 of FIG. 3. The first CT scan can include a plurality of scans of the first element taken while rotating the apparatus 200, and combined to develop a three-dimensional CT scan. In some embodiments, a positioning device can be configured to position the apparatus 200 within the three-dimensional space such that the first element is placed in close proximity to the radiation source (e.g., 102 of FIG. 1) to ensure an accurate scan of the first element.

The method can also include a step 1020 of determining, by the at least one data processor, one or more first validation metrics for the CT scanner based on the first CT scan. In some embodiments, the one or more first validation metrics can include a probing error form and/or a probing error size. In some embodiments, the probing error form can be determined by comparing the measured surface of the sphere to its true surface, which can be calculated based on the known diameter and material properties of the sphere. A mathematical model can be fitted to the measured data to quantify the shape of the probing error. In some embodiments, the probing error size can be determined by calculating the standard deviation of the position error at each point on the sphere. The standard deviation provides a measure of the magnitude of the probing error and can be used to compare the performance of different CT scanners. In some embodiments, the one or more first validation metrics can be determined according to the VDI/VDE 2630 standard (specifically, VDI/VDE 2630 4.1.2). VDI/VDE 2630 is a standard that provides guidelines for validating the performance of CT imaging systems used in industrial applications. The standard aims to ensure that the CT scans produced by these systems are accurate, reliable, and consistent with established quality requirements. The validation process includes verification of system parameters, assessment of imaging performance, evaluation of image quality, and documentation of the results, providing a comprehensive approach to CT scan validation.

For example, in the case where the first element is a sphere, the determining of the one or more first validation metrics can include: reconstructing the first CT scan to obtain the 3D volume dataset of the first element, segmenting the 3D dataset to extract the spherical shape of the test object, fitting a sphere to the segmented dataset using a least-squares fitting algorithm, determining a first scan diameter of the sphere corresponding to the actual first diameter, determining a deviation between the first scan diameter and the actual first diameter (probing error form). The determining of the one or more first validation metrics can further include determining a difference between a first scan radius of the sphere and the actual first radius (probing error size).

The method can also include a step 1030 of receiving, by the at least one processor, a second CT scan of a second element of the apparatus, wherein the second element includes a base structure and a first set of test objects coupled to the base structure. In some embodiments, the second element can be similar to the second element 400 of FIGS. 4A-4C. The second CT scan can include a plurality of scans of the second element taken while rotating the apparatus 200, and combined to develop a three-dimensional CT scan. In some embodiments, the positioning device can be configured to position the apparatus 200 within the three-dimensional space such that the second element is placed in close proximity to the radiation source (e.g., 102 of FIG. 1) to ensure an accurate scan of the second element.

The method can also include a step 1040 of determining, by the at least one processor, one or more second validation metrics for the CT scanner based on the second CT scan. In some embodiments, the one or more second validation metrics can include a sphere distance error (SDE) of the CT system (e.g., CT system 100). The SDE can be determined, for example, according to procedures laid out in the VDI/VDE 2630 guidelines. Specifically, the second element 400 can be designed to provide validation metrics to comply with VDI/VDE 2630 4.2.4. VDI/VDE 2630 4.2.4 is a section of the standard that describes the procedures for determining the measurement uncertainty of CT scans and provides guidelines for calculating and reporting the uncertainty associated with dimensional measurements made using CT scans. SDE is a measure of the accuracy of the distance measurement between two spheres (e.g., a distance between a center of sphere 420a and a center of sphere 420b) that are placed at a known distance from each other. In some embodiments, determining the SDE can include determining, from the second CT scan, a first set of scan distances (e.g., a distance between a center of sphere 420a and a center of sphere 420b, etc.) and comparing the first set of scan distances to the known distances between the spheres (e.g., a distance between a center of sphere 420a and a center of sphere 420b, etc.). In some cases, the SDE of a CT system can be affected by various factors, including, but not limited to beam hardening, noise, and geometric distortion.

The method can also include a step 1050 of receiving, by the at least one processor, a third CT scan of a third element of the apparatus having a second diameter and a first length. In some embodiments, the third element can be the third element 500 of FIG. 5. The third CT scan can include a plurality of scans of the third element taken while rotating the apparatus 200, and combined to develop a three-dimensional CT scan. In some embodiments, the positioning device can be configured to position the apparatus 200 within the three-dimensional space such that the third element is placed in close proximity to the radiation source (e.g., 102 of FIG. 1) to ensure an accurate scan of the third element.

The method can also include a step 1060 of determining, by the at least one processor, one or more third validation metrics for the CT scanner based on the third CT scan. In some embodiments, the one or more third validation metrics can include a Modulation Transfer Function (MTF) and a Contrast Discrimination Function (CDF) of the CT system (e.g., CT system 100). More specifically, in some embodiments, the third validation metrics can include an MTF 10% metric. The MTF 10% metric represents the spatial frequency at which the MTF drops to 10% of its maximum value. In other words, the MTF 10% metric is the point at which the CT system can no longer distinguish high-contrast features with a certain level of accuracy. The MTF 10% is a commonly used parameter for CT scanner evaluation as it provides an objective measure of the system's spatial resolution. In some embodiments, the MTF and/or MTF 10% and the CDF can be determined, for example, according to procedures laid out in the ASTM E1695 guidelines.

The method can also include a step 1070 of receiving, by the at least one processor, a first x-ray image of a first face of a fourth element of the apparatus. In some embodiments, the fourth element can be the fourth element 700 of FIGS. 6A-6B with the first surface being the first surface 705. The first x-ray image can be a two-dimensional image of the first face 705 of the fourth element 700. In some embodiments, the positioning device can be configured to position the apparatus 200 within the three-dimensional space such that the fourth element is placed in close proximity to the radiation source (e.g., 102 of FIG. 1), with the first face 705 directly facing the radiation source to ensure an accurate scan of the fourth element.

The method can also include a step 1080 of determining, by the at least one processor, fourth validation metrics for the CT scanner based on the first x-ray image. In some embodiments, the fourth validation metrics can include a spatial resolution, a contrast-to-noise ratio, a contrast sensitivity, and/or the at least one signal-to-noise ratio.

In some embodiments, the spatial resolution validation metric can be determined based on a portion of the first x-ray image including a fifth element (e.g., fifth element 800). In some cases, the spatial resolution validation metric can be determined by the computing system coupled to the CT scanner by determining a smallest wire pair of the plurality of wire pairs (i.e., 810-834) for which a gap can be detected there between. For example, based on FIG. 7, a computing system could determine that the CT system is only capable of resolving a gap between wire pairs down to wire pair 830. Accordingly, the based on the smallest wire pair resolved by the CT scanner and the specifications of the fifth element 800, the system can determine a resolution of the CT system according to, for example, ASTM E2002 standards for resolution.

In some embodiments, the contrast-to-noise ratio and the contrast sensitivity validation metrics can be determined based on a portion of the first x-ray image including one or more sixth elements (e.g., sixth element 900A) and a seventh element (e.g., seventh element 900B). In some cases, the contrast-to-noise ratio can be determined from the first x-ray image by the computing system coupled to the CT scanner by determining, for example, a first pixel intensity for the sixth element 900A, a second pixel intensity for the back wall of the second cavity (e.g., 730a), and a smallest detected hole of the first plurality of holes of the sixth element 900A. The processor can be configured to compare the first pixel intensity and the second pixel intensity, and determine a difference in the mean gray level values of the first pixel intensity and the second pixel intensity. In some embodiments, this difference can be divided by the standard deviation of the second pixel intensity.

In some cases, determining the contrast-to-noise ratio can also include determining, for example, a third pixel intensity for the seventh element 900B, a fourth pixel intensity for the first face (e.g., 705), and a smallest detected hole of the second plurality of holes of the seventh element 900B. The processor can be configured to compare the third pixel intensity and the fourth pixel intensity, and determine a difference in the mean gray level values of the third pixel intensity and the fourth pixel intensity. In some embodiments, this difference can be divided by the standard deviation of the fourth pixel intensity.

In some embodiments, the contrast sensitivity can be determined based on the smallest hole of the first plurality of holes (e.g., 905A, 910A, 915A) and/or the smallest hole of the second plurality of holes (e.g., 905B, 910B, 915B) that can be determined by the processor from the first x-ray image. In some embodiments, the contrast-to-noise ratio and the contrast sensitivity can be determined according to ASTM E1025.

In some embodiments, the at least one signal-to-noise ratio validation metric can be determined based on a portion of the first x-ray image including the fourth element (e.g., fourth element 700). Determining the at least one signal-to-noise ratio validation metric can include determining, by the processor, at least one region of interest of the fourth element from the first x-ray image. In some embodiments, the at least one region of interest can be determined automatically by the processor. In some embodiments, the at least one region of interest can be determined by a user interacting with a graphical user interface display coupled to the processor and configured to display the first x-ray image to the user. Based on the at least one region of interest, the processor can be configured to determine at least one mean signal value corresponding to the at least one region of interest, and at least one standard deviation for each of the at least one mean signal value from the first x-ray image. The processor can be configured to determine the at least one signal-to-noise ratio as a ratio of the at least one mean signal value and the at least one standard deviation for each of the at least one mean signal value. In some embodiments, the at least one signal-to-noise ratio can include a signal-to-noise ratio for a plurality of depths of material of the fourth element.

In some embodiments, the method can also include a step 1090 of providing, by the processor, the validation metrics to a user. The validation metrics can be used by a user to determine if the CT system is operating up to standard, or if further calibration or replacement is required.

Figure 10:
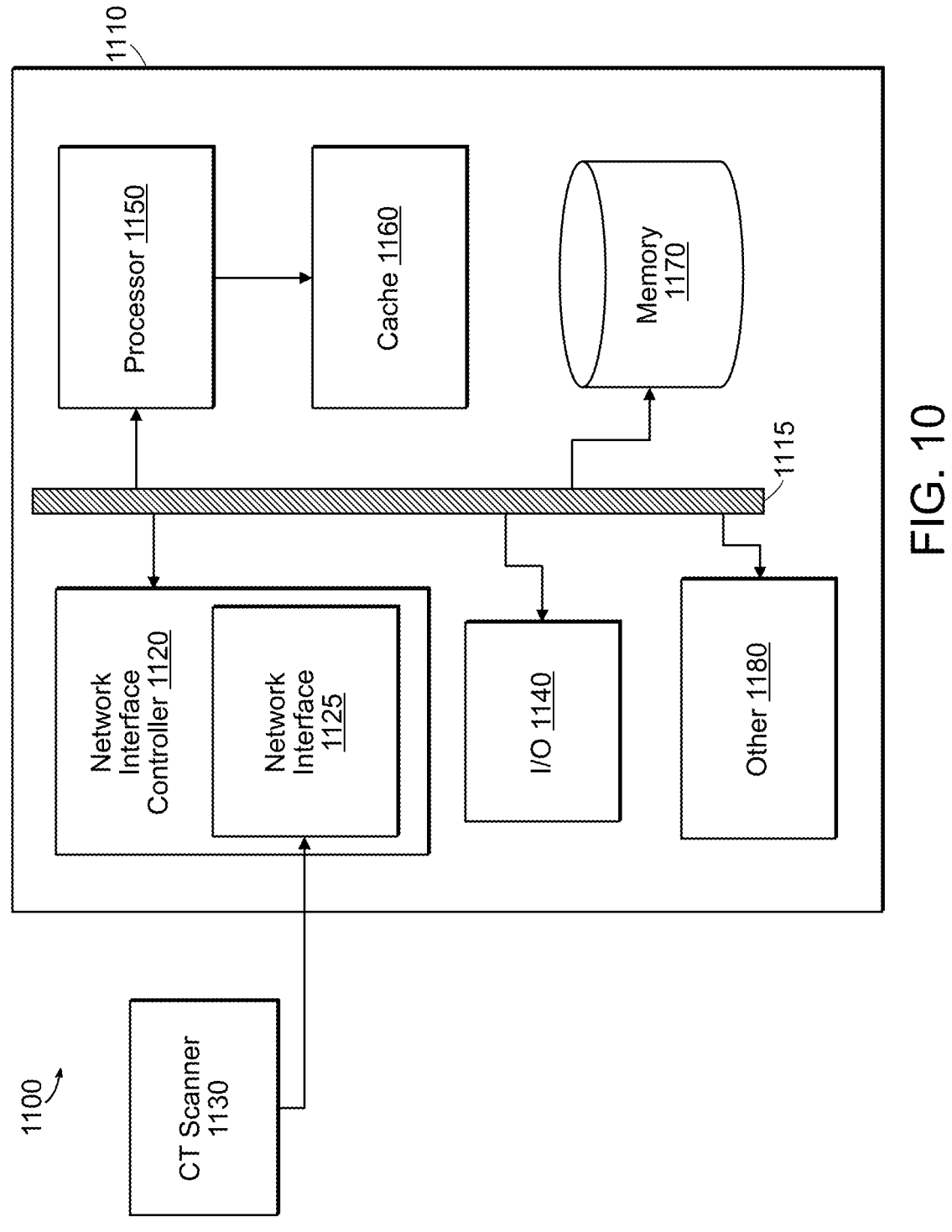
FIG. 10 is a diagram illustrating an exemplary computing system for validating a CT system using a validation apparatus as described herein.

FIG. 10 is a block diagram 1100 of a computing system 1110 suitable for use in implementing the computerized components described herein. In broad overview, the computing system 1110 includes at least one processor 1150 for performing actions in accordance with instructions, and one or more memory devices 1160 and/or 1170 for storing instructions and data. The illustrated example computing system 1110 includes one or more processors 1150 in communication, via a bus 1115, with memory 1170 and with at least one network interface controller 1120 with a network interface 1125 for connecting to a CT scanner 1130, e.g., a CT system 100 in reference to FIG. 1. The one or more processors 1150 are also in communication, via the bus 1115, with each other and with any I/O devices at one or more I/O interfaces 1140, and any other devices 1180. The processor 1150 illustrated incorporates, or is directly connected to, cache memory 1160. Generally, a processor will execute instructions received from memory. In some embodiments, the computing system 1110 can be configured within a cloud computing environment, a virtual or containerized computing environment, and/or a web-based microservices environment.

In more detail, the processor 1150 can be any logic circuitry that processes instructions, e.g., instructions fetched from the memory 1170 or cache 1160. In many embodiments, the processor 1150 is an embedded processor, a microprocessor unit or special purpose processor. The computing system 1110 can be based on any processor, e.g., suitable digital signal processor (DSP), or set of processors, capable of operating as described herein. In some embodiments, the processor 1150 can be a single core or multi-core processor. In some embodiments, the processor 1150 can be composed of multiple processors.

The memory 1170 can be any device suitable for storing computer readable data. The memory 1170 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 1110 can have any number of memory devices 1170.

The cache memory 1160 is generally a form of high-speed computer memory placed in close proximity to the processor 1150 for fast read/write times. In some implementations, the cache memory 1160 is part of, or on the same chip as, the processor 1150.

The network interface controller 1120 manages data exchanges via the network interface 1125. The network interface controller 1120 handles the physical, media access control, and data link layers of the Open Systems Interconnect (OSI) model for network communication. In some implementations, some of the network interface controller's tasks are handled by the processor 1150. In some implementations, the network interface controller 1120 is part of the processor 1150. In some implementations, a computing device 1110 has multiple network interface controllers 1120. In some implementations, the network interface 1125 is a connection point for a physical network link, e.g., an RJ 45 connector. In some implementations, the network interface controller 1120 supports wireless network connections and an interface port 1125 is a wireless Bluetooth transceiver. Generally, a computing device 1110 exchanges data with the CT System 1130, via physical or wireless links to a network interface 1125. In some implementations, the network interface controller 1120 implements a network protocol such as LTE, TCP/IP Ethernet, IEEE 802.11, IEEE 802.16, Bluetooth, or the like.

The CT system 1130 can be connected to the computing device 1110 via a network interface port 1125.

In some uses, the I/O interface 1140 supports an input device and/or an output device (not shown). In some uses, the input device and the output device are integrated into the same hardware, e.g., as in a touch screen. In some uses, such as in a server context, there is no I/O interface 1140 or the I/O interface 1140 is not used. In some uses, additional other components 1180 are in communication with the computer system 1110, e.g., external devices connected via a universal serial bus (USB).

The other devices 1180 can include an I/O interface 1140, external serial device ports, and any additional co-processors. For example, a computing system 1110 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 1110, e.g., a touch screen on a tablet device. In some implementations, a computing device 1110 includes an additional device 1180 such as a co-processor, e.g., a math co-processor that can assist the processor 1150 with high precision or complex calculations.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. An apparatus for validating performance of a computed tomography (CT) system comprising:
   a first spherical element having a first diameter;
   a base structure comprising a plurality of test objects coupled to the base structure and separated from one another by a first set of distances;
   a cylindrical element having a second diameter and a first length; and
   a prismatic element coupled to the base structure by the cylindrical element and having a first face and a second face parallel to one another and separated by a first thickness, wherein the apparatus is configured to be scanned by the CT system to determine a plurality of calibration metrics of the CT system based on the first spherical element, the base structure, the cylindrical element, and the prismatic element.

2. The apparatus of claim 1, further comprising a positioning element configured to rotate the apparatus about a first axis during scanning by the CT system.

3. The apparatus of claim 2, wherein the positioning element is further configured to move the apparatus in a three-dimensional space between a CT scanner and a detector of the CT system.

4. The apparatus of claim 3, wherein a center of the first spherical element, the base structure, the cylindrical element, and the prismatic element, respectively, are aligned along a first axis, and wherein the first spherical element is removably coupled to the base structure.

5. The apparatus of claim 1, wherein the plurality of test objects include a plurality of second spherical elements having varying sizes.

6. The apparatus of claim 5, wherein the base structure is a ceramic plate and the plurality of test objects are made from ruby or ceramic.

7. The apparatus of claim 1, further comprising a resolution element, wherein plurality of calibration metrics include a resolution of the CT system determined based on the resolution element.

8. The apparatus of claim 7, wherein the resolution element includes a plurality of wire pairs ranging in diameter from a smallest wire diameter to a largest wire diameter, and wherein a first wire of each pair is separated from a second wire of the pair by a distance equivalent to the diameter of each wire in the pair.

9. The apparatus of claim 8, wherein the resolution element is depressed a first depth into the first face of the prismatic element.

10. The apparatus of claim 1, wherein the plurality of calibration metrics include probing error metrics determined based on the first spherical element, a sphere distance error (SDE) determined based on the base structure, a Modulation Transfer Function (MTF) and a Contrast Discrimination Function (CDF) determined based on the cylindrical element, and a signal-to-noise ratio (SNR) determined based on the prismatic element.

11. The apparatus of claim 1, further comprising one or more image quality indicators (IQIs) provided on the first face of the prismatic element, wherein plurality of calibration metrics include a contrast-to-noise ratio (CNR) and a contrast sensitivity (CS) of the CT system determined based on the one or more IQIs.

12. The apparatus of claim 11, wherein the one or more IQIs include a first IQI having a second thickness that is a first predefined percentage of the first thickness of the prismatic element, a first hole having a diameter substantially equal to the second thickness, a second hole having a diameter substantially equal to twice the second thickness, and a third hole having a diameter substantially equal to four times the second thickness.

13. The apparatus of claim 12, wherein the one or more IQIs further comprise a second IQI having a third thickness that is a second predefined percentage of the first thickness of the prismatic element, a fourth hole having a diameter substantially equal to the third thickness, a fifth hole having a diameter substantially equal twice the third thickness, and a sixth hole having a diameter substantially equal four times the third thickness.

14. The apparatus of claim 13, wherein the first IQI is depressed a first into the first face of the prismatic element such that the first IQI is closer to the second face than the second IQI is to the second face.

15. The apparatus of claim 1, wherein the first spherical element, the base structure, the cylindrical element, and the prismatic element are removably coupled to one another to allow for replacement of any of the first spherical element, the base structure, the cylindrical element, and the prismatic element.

16. An apparatus comprising:
a first spherical element having a first diameter;
a base structure comprising a plurality of test objects coupled to the base structure and separated from one another by a first set of distances;
a cylindrical element having a second diameter and a first length; and
a prismatic element coupled to the base structure by the cylindrical element and having a first face and a second face parallel to one another and separated by a first thickness, wherein the apparatus is configured to be scanned by a CT system to determine a plurality of calibration metrics of the CT system including at least two of a probing error metric, a sphere distance error (SDE), a Modulation Transfer Function (MTF), a Contrast Discrimination Function (CDF), a signal-to-noise ratio (SNR), a resolution metric, a contrast-to-noise ratio (CNR), and a contrast sensitivity (CS) metric.

17. The apparatus of claim 16, further comprising:
a resolution element provided on the first face of the prismatic element, wherein the resolution element includes a plurality of wire pairs ranging in diameter from a smallest wire diameter to a largest wire diameter;
at least one image quality indicator (IQI) provided on the first face of the prismatic element, wherein the at least one IQI has a second thickness that is a first predefined percentage of the first thickness of the prismatic element, a first hole having a diameter substantially equal to the second thickness, a second hole having a diameter substantially equal to twice the second thickness, and a third hole having a diameter substantially equal to four times the second thickness.

18. The apparatus of claim 17, further comprising a positioning element configured to rotate the apparatus about a first axis during scanning by the CT system configured to move the apparatus in a three-dimensional space between a CT scanner and a detector of the CT system, wherein a center of the first spherical element, the base structure, the cylindrical element, and the prismatic element, respectively, are aligned along the first axis.

19. The apparatus of claim 17, wherein dimensions of the first spherical element, the base structure, the cylindrical element, the prismatic element, the resolution element and the at least one IQI are designed based on predetermined calibration and validation standards for the CT system.

20. The apparatus of claim 17, wherein the first spherical element, the base structure, the cylindrical element, the prismatic element, the resolution element, and the at least one IQI are removably coupled to the apparatus to allow for replacement of any of the first spherical element, the base structure, the cylindrical element, the prismatic element, the resolution element, and the at least one IQI.

* * * * *